Nov. 24, 1931.  A. KOWALSKY  1,832,936
HARVESTER
Filed Nov. 1, 1926  3 Sheets-Sheet 2
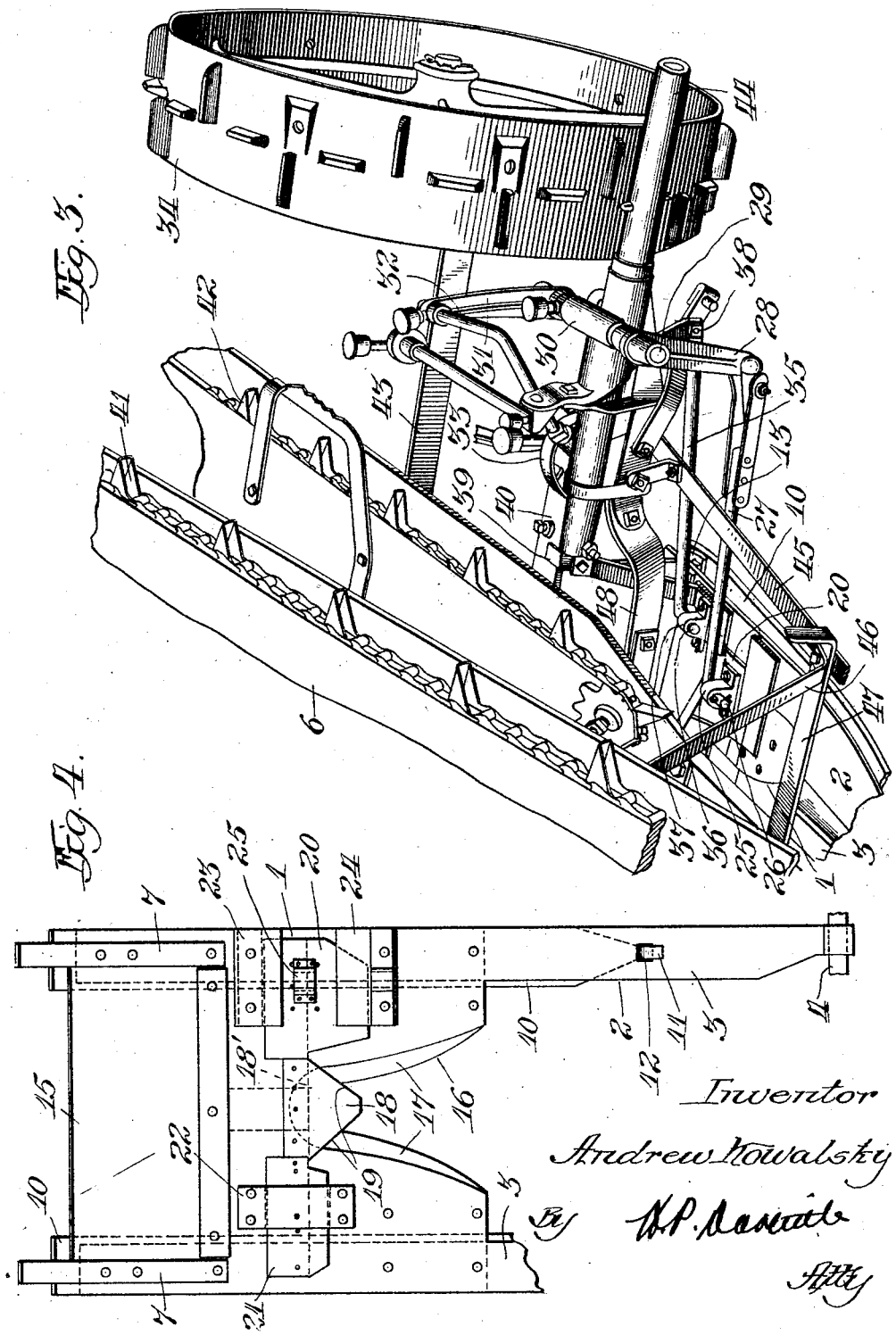
Inventor
Andrew Kowalsky Nov. 24, 1931.  A. KOWALSKY  1,832,936
HARVESTER
Filed Nov. 1, 1926   3 Sheets-Sheet 3

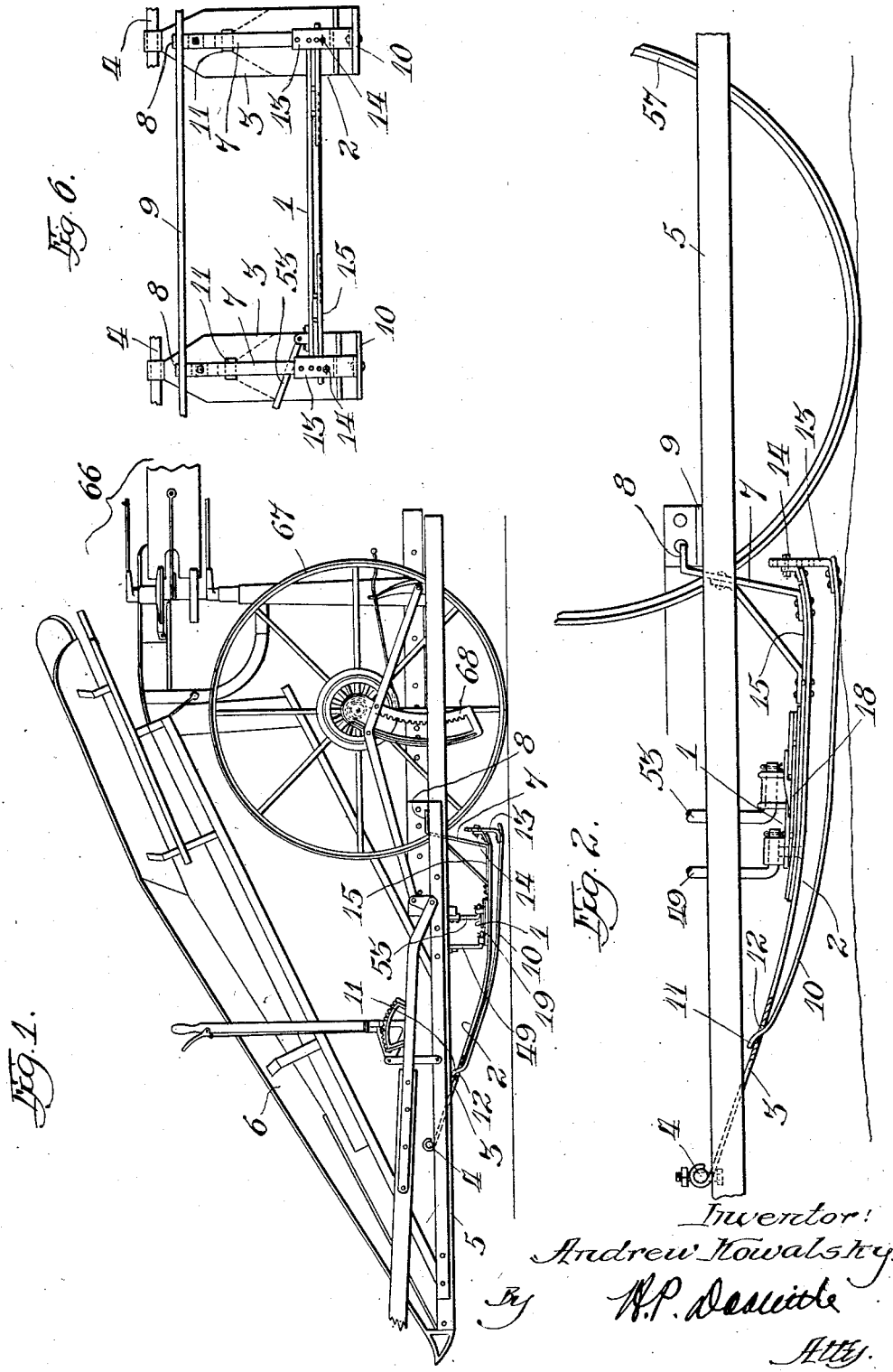

Inventor:
Andrew Kowalsky

Patented Nov. 24, 1931

1,832,936

UNITED STATES PATENT OFFICE

ANDREW KOWALSKY, OF OAK PARK, ILLINOIS, ASSIGNOR TO INTERNATIONAL HARVESTER COMPANY, A CORPORATION OF NEW JERSEY

HARVESTER

Application filed November 1, 1926. Serial No. 145,389.

This invention relates to harvesters and more particularly to a novel and practical cutting mechanism for such machines.

One of the objects of the invention has to do with the abatement of the ravages of an insect pest known as the corn borer. This pest has been materially damaging the corn crop of a large section of the country and the extent of the territory over which such ravages occur has been increasing. The insects devour large portions of the ears of corn and hibernate in such parts of corn stalks as may be left in the field between one harvest and the succeeding planting. It is one purpose of this invention to provide a corn harvester which will enable the user to harvest his corn in such a manner that there will be a minimum of the stalks or plants left in the field to afford sustenance for the pest from harvest time to the succeeding planting period.

It is also an object of the invention to provide a corn binder with a practical and successful cutting apparatus related to the other parts of the machine in a novel manner.

It is a further object of the invention to provide a corn harvester with a floating cutter bar which will closely follow the contour of the ground and enable the machine to gather practically all of the stalks above ground.

In the accompanying drawings:

Fig. 1 is a side illustration of a harvester with the illustrative cutting mechanism applied thereto;

Fig. 2 is a partial side elevation of the illustrative cutting mechanism;

Fig. 3 is a perspective view of a corn harvester showing one form of the illustrative cutting mechanism embodied therein;

Fig. 4 is a plan of the illustrative cutting mechanism showing the arrangement of runners and supporting bars for the cutting mechanism;

Figure 5:
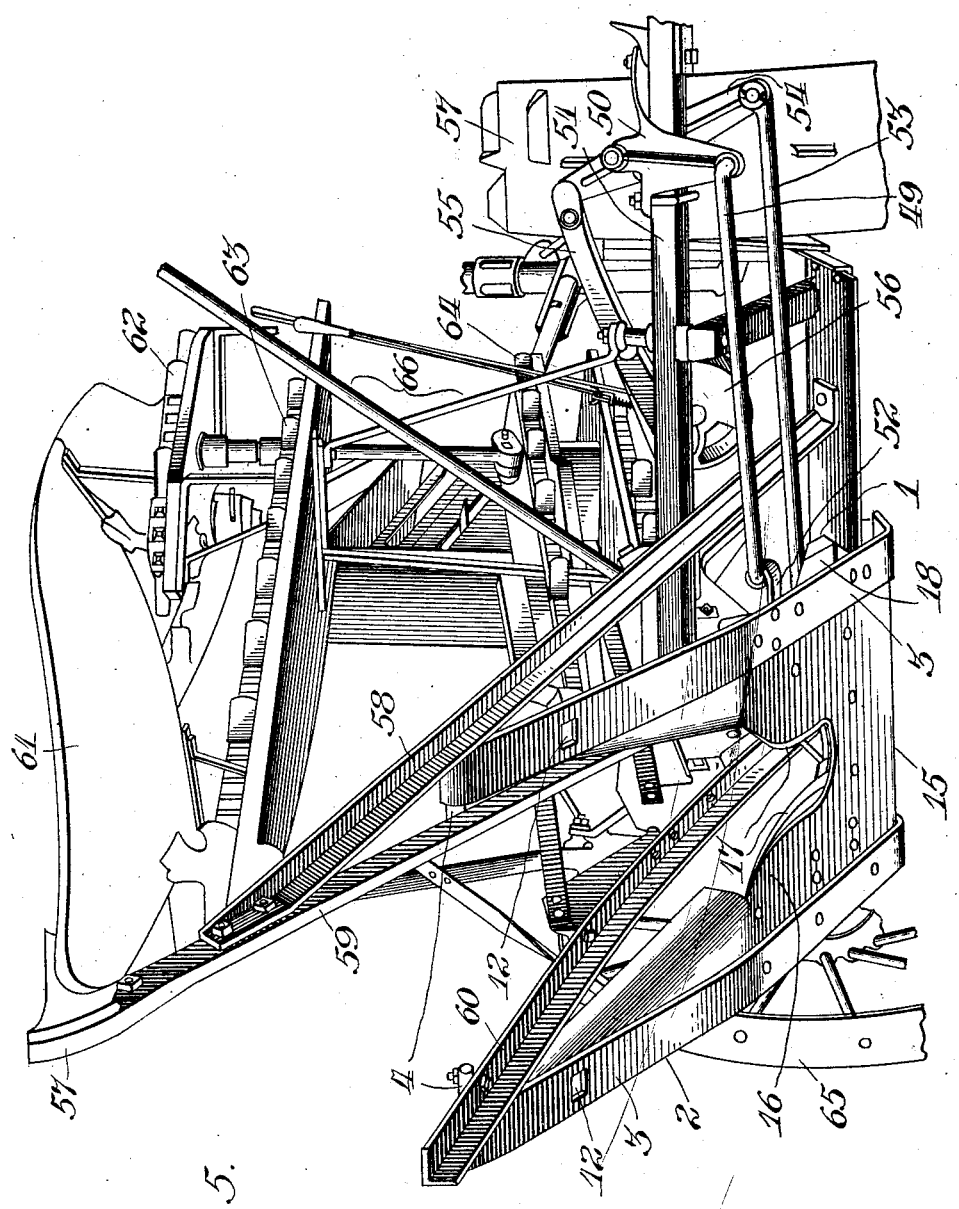

Fig. 5 is a perspective view of a corn binder with another embodiment of the illustrative cutting mechanism applied thereto, the forward end of the corn binder being tipped up out of normal position for the purpose of clearly illustrating the relation of the cutting mechanism to the gathering boards; and Figure 6 is a rear view showing the floating auxiliary frame and the cutting mechanism which it carries.

The illustrative cutting mechanism comprises a cutter 1 herein shown as including a reciprocating cutter bar. This cutter is supported by a floating auxiliary frame 2. The auxiliary frame preferably comprises runners 3 pivotally mounted at their forward ends upon the frame of the harvester.

In the structure shown in the drawings the auxiliary frame is mounted upon a pivot pin 4 secured to a frame member 5, which in turn is secured to the gathering boards 6 of the harvester.

The illustrative cutting mechanism is herein referred to as a floating cutter because of the fact that it is substantially free to move up and down as its runner supports ride over the surface of the ground.

In Fig. 2 of the drawings the rearward end of the cutting mechanism is shown as provided with a stop 7, which is free to move vertically except as to its downward movement, movement in that direction being limited by contact of the horizontal portion 8 of the stop with a cooperating stop member 9 upon the frame of the harvester.

The illustrative cutting mechanism is also provided with resilient sub-runners 10, which advantageously affect the operation of the machine and prevent injury to the runners 3 in case the latter should contact with rocks or other obstacles which might otherwise materially damage the cutting mechanism.

Fig. 2 of the drawings illustrates the manner of securement of the sub-runners 10 to the runners 3. As shown, the sub-runners 10 are formed with upwardly turned ends 11 which project thru openings 12 in the runners 3. The sub-runners are interlocked with the runners 3 by a vertical adjusting plate 13 secured to the sub-runners and to the rearward ends of the runners 3 by attaching devices 14. The height of the cutting mechanism and the capability of the runners for absorbing shocks may be varied by changing the position of the attaching devices relative to the member 13 as clearly indicated in the drawings.

The rearward ends of the runners 3 are connected by cross member 15 as shown in Fig. 4 of the drawings so as to form a substantially U-shaped floating auxiliary frame. This cross member 15 is preferably rigidly secured to the runners 3. The mid portions of the runners 3 are also connected by a stationary cutter blade 16, preferably formed of hardened steel and provided with sharpened beveled cutting portions 17. The movable cutting member is herein shown as a reciprocating blade 18, secured to a cutter bar lying underneath the blade, one edge of the cutter bar being indicated at 18' in Fig. 4.

As illustrated in Fig. 4 of the drawings, the reciprocating cutting blade 18 is provided with cutting edges 19, which cooperate with the cutting portions 17 of the stationary cutting member to effectively sever stalks of corn. The cutting blade 18 is guided in its reciprocating movements by guide plates 20 and 21, which are preferably rigidly secured to the cutter bar 18' at either side of the cutting blade. The guide members 20 and 21 operate in guide ways formed by plates 22, 23 and 24, these plates being shown as secured to the stationary cutter member and to the runner frame.

Referring to the embodiment of the invention shown in Fig. 3 of the drawings, the guide plate 20 has secured at one end thereof a pivot block 25 in which is pivotally mounted the angular end 26 of a connecting rod 27, properly reciprocated by a crank arm 28 secured to a crank shaft 29. The crank shaft 29 is mounted in a bearing 30 secured to the framework of the machine as shown. The end of the crank shaft 29 opposite the crank arm 28 has secured thereto a second crank arm 31, which is oscillated by a connecting rod 32 preferably driven by a rotary member 33. The rotary member 33 may be driven by power derived from the bull wheel 34 or by any other suitable source of power.

Referring again to the embodiment of the invention shown in Fig. 3, the floating auxiliary frame 2 is held in proper position relative to the other parts of the harvester by means of a rod 35 pivoted at 36 to a pivot block 37, fixedly secured to the auxiliary frame. The end of the rod 35 opposite the pivot block 37 is pivotally attached at 38 to a stationary part of the frame of the harvester. This arrangement of elements always maintains the cutting mechanism and the floating auxiliary frame in such position that the mechanism for operating the cutter bar will never be hindered in its operation.

The embodiment shown in Fig. 3 includes a horizontal stop member 39, which may engage the frame member 40 to limit the downward movement of the cutter mechanism relative to the frame of the harvester. It will be apparent from this disclosure that the cutter mechanism is free to move upwardly or downwardly except for the above mentioned limitation of its downward movement. The other parts of the harvester shown for the purposes of illustration in Fig. 3 include the stalk elevating chains 41 and 42, the frame member 43, the supporting rod 44 and the various braces 45, 46, 47 and 48 for holding the parts of the machine in their proper positions.

In Fig. 5 of the drawings the invention is illustrated in an embodiment slightly different from that shown in Fig. 3. In this embodiment the floating cutter mechanism is not provided with sub-runners and the devices for guiding the auxiliary frame in its vertical movements are differently located. It will be noted that the runners 3 and the cutter mechanism carried thereby are maintained in proper relation to the other parts of the harvester by a pivoted rod 49, pivoted to a fixed support 50 secured in front of a stationary frame bar 51, the inner end of the rod 49 being pivoted to a strap member 52 fixedly secured to the auxiliary frame.

In the embodiment shown in Fig. 5, the reciprocating cutter is operated by connecting rod 53 pivotally connected at its outer end to a lever 54, preferably pivotally mounted between its ends on the stationary frame member 51. The lever 54 is oscillated by means of a connecting rod 55 which receives its power from the rotary member 56 driven by the bull wheel 57 or by any other preferred source of power.

It will be noted that the forward end of the corn harvester shown in Fig. 5 is tipped upwardly out of its normal operating position. The gatherer points 57 normally operate in a position close to the ground, and the frame members 58, 59 and 60 are normally in a substantially horizontal position, the gathering boards 61 also normally extending upwardly and rearwardly at a considerable inclination to the horizontal. Other parts of the harvester shown in Fig. 5 of the drawings include the stalk elevating chains 62, 63, and 64, the grain wheel 65 and some parts of the binding mechanism the position of which is represented by the reference numeral 66.

In Fig. 1 of the drawings the frame of the harvester is illustrated as supported by a bull wheel 67 adjustably mounted relative to the frame 5 by means of a leveling segment 68, parts of the binding mechanism being herein again illustrated by the reference character 66.

While the invention has been illustrated by a description of particular mechanisms it is to be understood that the invention is not limited thereto but that it is capable of use in various combinations and sub-combinations within the scope of the appended claims.

What is claimed is:

1. A corn harvester comprising, in combination, a main frame, gathering boards, a floating auxiliary frame movably supported on the main frame beneath the gathering boards and extending across the passage between the gathering boards, and a grain cutter carried by the auxiliary frame.

2. A corn harvester comprising, in combination, a wheel supported main frame, gathering boards carried by the main frame, an auxiliary frame pivotally mounted beneath the gathering boards, a reciprocating stalk cutter, and a stationary cutter, both of said cutters being carried by the auxiliary frame.

3. A harvester comprising, in combination, a main frame, stalk gathering devices forming a stalk passage between them a floating auxiliary frame pivotally connected to said devices, and stalk cutting apparatus carried by the auxiliary frame so as to cut stalks in close proximity to the ground.

4. A corn binder comprising, in combination, a wheel supported main frame, stalk gathering devices carried by the main frame and forming a stalk passage therebetween, a U-shaped auxiliary frame having its legs pivotally connected to the main frame, and a reciprocating stalk cutter carried by the auxiliary frame.

5. The combination expressed in claim 4 characterized by ground engaging runners resiliently supporting the auxiliary frame.

6. The combination expressed in claim 4 characterized by a link located to one side of the auxiliary frame and pivotally connected at its ends to the main frame and the auxiliary frame, respectively.

7. A corn binder comprising, in combination, a wheel supporting frame, gathering boards, stalk elevating chains, stalk cutting apparatus, stalk binding mechanism, a support for the cutting apparatus pivotally connected one end with the main frame, a link pivotally connecting the auxiliary frame and the main frame and extending laterally from the former, and means for operating the cutting apparatus supported at a point adjacent the connection between the link and the main frame.

8. A corn binder comprising, in combination, a wheel supported main frame, gathering boards, stalk cutting apparatus, stalk elevating chains, stalk binding mechanism, and a floating auxiliary frame carrying the cutting apparatus, said floating auxiliary frame comprising members pivotally connected with the main frame at their forward ends and resilient sub-runners for supporting and protecting the first mentioned members.

9. A harvester comprising, in combination, a wheel supported main frame, gathering boards, means for changing the vertical positions of the gathering boards, a floating auxiliary frame pivotally mounted beneath the main frame and pivotally movable relative to the gathering boards, a reciprocating cutter bar carried by the floating auxiliary frame so as to cut stalks in close proximity to the ground, operating means carried by the main frame, and means connecting the reciprocating cutter bars with the operating means for moving the former.

10. A corn binder comprising, in combination, wheel supported stalk gathering boards, means for vertically adjusting the forward ends of the gathering boards, a floating auxiliary frame pivotally movable relative to the gathering boards and located beneath them, a stalk cutter carried by the auxiliary frame, a sub-runner for resiliently mounting and protecting the auxiliary frame, means for limiting the downward movement of the auxiliary frame, and means for operating the cutter.

11. In a corn harvester, a wheel supported frame, stalk gathering devices, a stalk cutter, a floating support for the stalk cutter, pivotal connections between the support and the frame, a laterally extending guide link pivoted to the support and the frame, and a pitman extending substantially parallel to the guide link and connecting the cutter and the frame.

12. In a corn harvester, a floating reciprocating stalk cutter, a floating frame carrying said cutter, a rotary member, power transmitting connections for so connecting the rotary member to the cutter that reciprocating motion is transmitted to the cutter, an intermediate support for said power transmitting connections, and a link pivoted to the support and pivotally connected to said frame.

13. A harvester comprising, in combination, a main frame, a floating auxiliary frame pivotally secured to the main frame at its forward end, a reciprocating cutter bar carried by the auxiliary frame, a support fixed on the main frame at one side of the auxiliary frame, a pivotal connection between the support and the auxiliary frame, power transmitting connections for operating the cutter carried by the auxiliary frame, and a support for an intermediate part of said power transmitting connections.

14. A harvester comprising, in combination, a main frame, a floating auxiliary frame, a reciprocating cutter carried by said auxiliary frame, a pitman, a lever pivoted to the main frame and having one end connected to said pitman, a link connecting the other end of said lever with the reciprocating cutter, and a link pivotally connected to the main frame for guiding the auxiliary frame during its up and down movements.

15. A corn binder comprising, in combination, a stalk cutter, a main frame, an auxiliary frame carrying the stalk cutter, and substantially parallel links extending from the same side of said auxiliary frame, one of said links for operating the cutter and the other for guiding the auxiliary from during its vertical movements.

16. A corn harvester comprising, in combination, a main frame, gathering boards, an auxiliary frame pivotally connected to the main frame and located beneath the gathering boards, a reciprocating stalk cutter carried by the auxiliary frame, and power transmitting connections for operating the cutter, said power transmitting connections extending from the cutter outwardly and laterally of the auxiliary frame and thence inwardly to a driving element located on the main frame.

17. In a corn harvester, a main frame, stalk gathering devices, a stalk cutter, a floating support for the stalk cutter, pivotal connections between the support and the frame, a laterally extending guide link pivoted to the support and to the frame, and power transmitting connections extending from a rotary member on the main frame to the cutter, said power transmitting connections including a member pivoted on the main frame at a position substantially within the same vertical confines as the outer end of the guide link.

18. A harvester comprising, in combination, a main frame, a floating auxiliary frame pivotally secured to the main frame at its forward end, a reciprocating cutter bar carried by the auxiliary frame, a pivot block fixed on the main frame at one side of the auxiliary frame, a pivotal connection between the pivot block and the auxiliary frame, power transmitting connections for operating the cutter carried by the auxiliary frame, and a support for an intermediate part of said power transmitting connections located adjacent said pivot block.

19. In a corn harvester, a main frame, stalk gathering devices, a stalk cutter, a floating support for the stalk cutter, pivotal connections between the support and the frame, a laterally extending guide link pivoted to the support and to the frame, and power transmitting connections extending from a driving member on the main frame to the cutter, said power transmitting connections including a member pivoted on the main frame at a position substantially adjacent to the outer end of the guide link.

20. A corn harvester comprising, in combination, a main frame, stalk gathering devices carried by the main frame, a floating auxiliary frame pivotally secured at its forward end to the main frame beneath the stalk gathering devices, stationary and movable cutters carried by the auxiliary frame, a stop carried by the auxiliary frame, and a second stop carried by the main frame in the path of movement of the first stop and serving to limit the floating movement of the auxiliary frame relative to the main frame.

21. A harvester comprising, in combination, a main frame, supports on the main frame carrying stalk gathering devices which form a stalk passage, a floating auxiliary frame pivotally connected to the main frame beneath each of the stalk gathering devices, pivotal connections at the forward ends of the auxiliary frame for associating that frame with the main frame, main runners constituting the side parts of said auxiliary frame, resilient ground engaging sub-runners secured underneath the main runners, stationary stalk cutting means secured to and located between the main runners, and a moving stalk cutter carried by the main runners.

22. A harvester comprising, in combination, a main frame, supports on the main frame carrying stalk gathering devices which form a stalk passage therebetween, a floating auxiliary frame pivoted at its forward end to the main frame beneath the stalk gathering devices, side runners comprising parts of the auxiliary frame and formed near their forward ends with orifices, ground engaging sub-runners beneath the side runners and having their forward ends inserted through the orifices in the side runners, means for securing the sub-runners to the side runners at their rearward ends, and stalk cutting mechanism carried by the side runners.

In testimony whereof I affix my signature.

ANDREW KOWALSKY.